(No Model.) 2 Sheets—Sheet 1.

C. H. HALL.
POTATO DIGGER.

No. 529,122. Patented Nov. 13, 1894.

WITNESSES:
N. B. Brown
Arthur Garner

INVENTOR
Charles H. Hall
BY
Wm. B. Matthews
ATTORNEY.

(No Model.) 2 Sheets—Sheet 2.
C. H. HALL.
POTATO DIGGER.
No. 529,122. Patented Nov. 13, 1894.
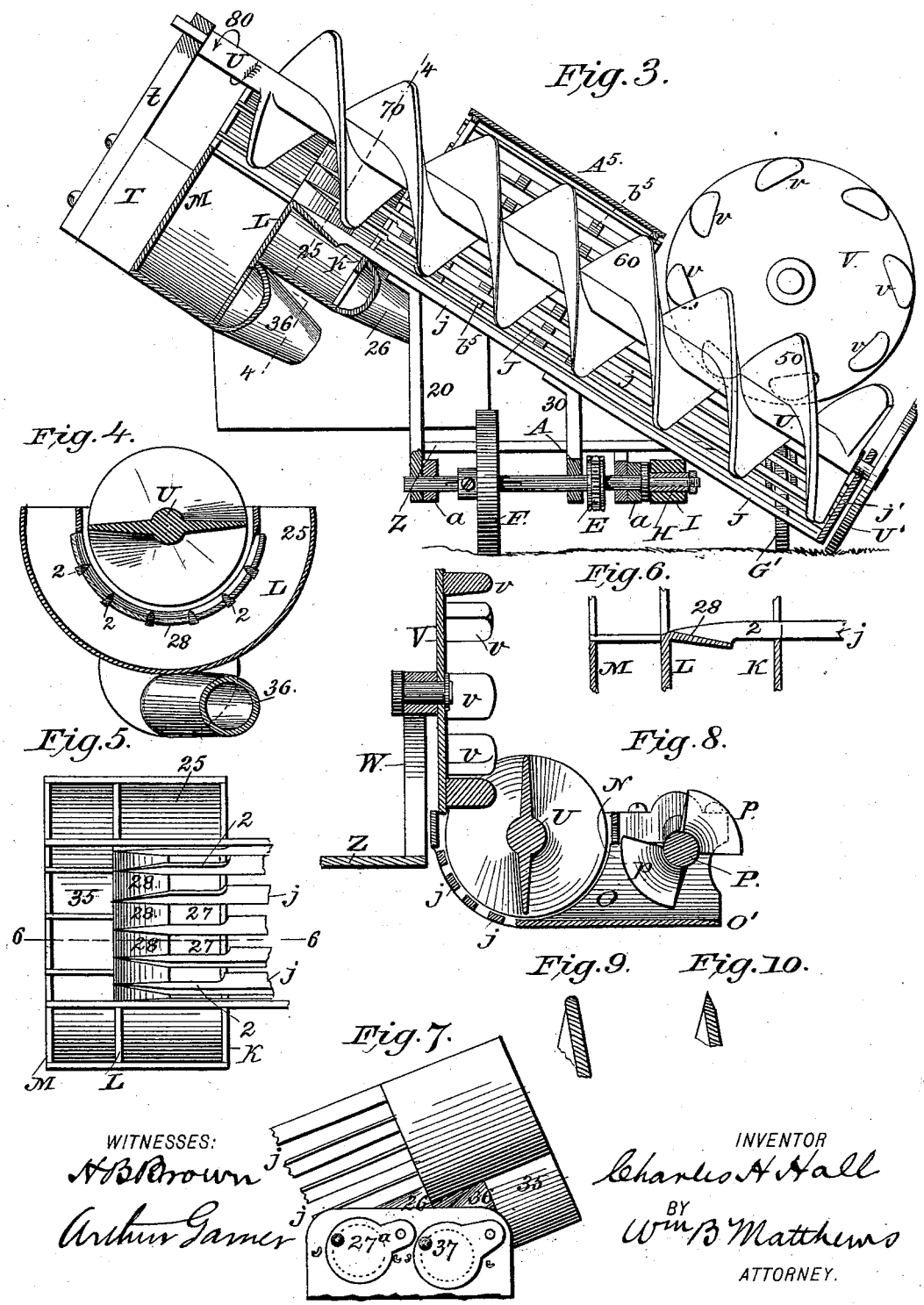
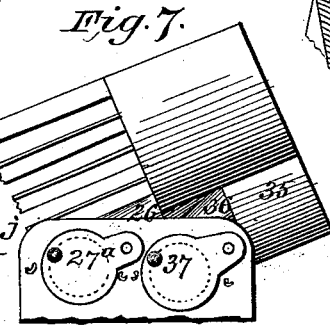
WITNESSES:
N. B. Brown
Arthur Garner
INVENTOR
Charles H. Hall
BY
Wm B Matthews
ATTORNEY.

UNITED STATES PATENT OFFICE.

CHARLES H. HALL, OF GLIDDEN, WISCONSIN, ASSIGNOR OF ONE-HALF TO ALMOND D. HALL, JOHN V. KINNEY, AND JOSEPH K. ROY, OF ST. LOUIS, MISSOURI.

POTATO-DIGGER.

SPECIFICATION forming part of Letters Patent No. 529,122, dated November 13, 1894.

Application filed May 24, 1894. Serial No. 512,261. (No model.)

*To all whom it may concern:*

Be it known that I, CHARLES H. HALL, a citizen of the United States, residing at Glidden, in the county of Ashland and State of Wisconsin, have invented certain new and useful Improvements in Potato-Diggers; and I do declare the following to be a full, clear, and exact description of the invention, such as will enable others skilled in the art to which it appertains to make and use the same.

My invention, which is in the nature of a potato digging machine, has primarily for its object to provide a machine of this kind, which will effectively and economically serve for its intended purposes, and which is of a simple construction and capable of easy manipulation.

It has also for its object to provide a machine of this kind in which the elevating and separating means are so arranged, that the sprouts will be separated from the tubers before they arrive at the discharging end, and also so constructed that the smaller sizes will be separated from the larger at such end and such separated sizes discharged into separate receivers held on the main frame.

Further, it has for its object to provide in a machine of this kind a combined elevating, sprout severing, and potato assorting means, which will positively serve their intended purposes, without clogging, bruising or cutting the tubers as they are carried from the receiving to the discharge end.

It has also for its object to produce a machine having the elevating and digger devices adjustably supported on the main frame, whereby they can be quickly thrown into or out of operative condition by a single lever arranged adjacent to the driver's seat.

With other minor objects in view, which hereinafter will appear, my invention consists in such novel arrangement and peculiar combination of parts, as will be first described in detail and then be specifically pointed out in the appended claims, reference being had to the accompanying drawings, in which—

Figure 1:
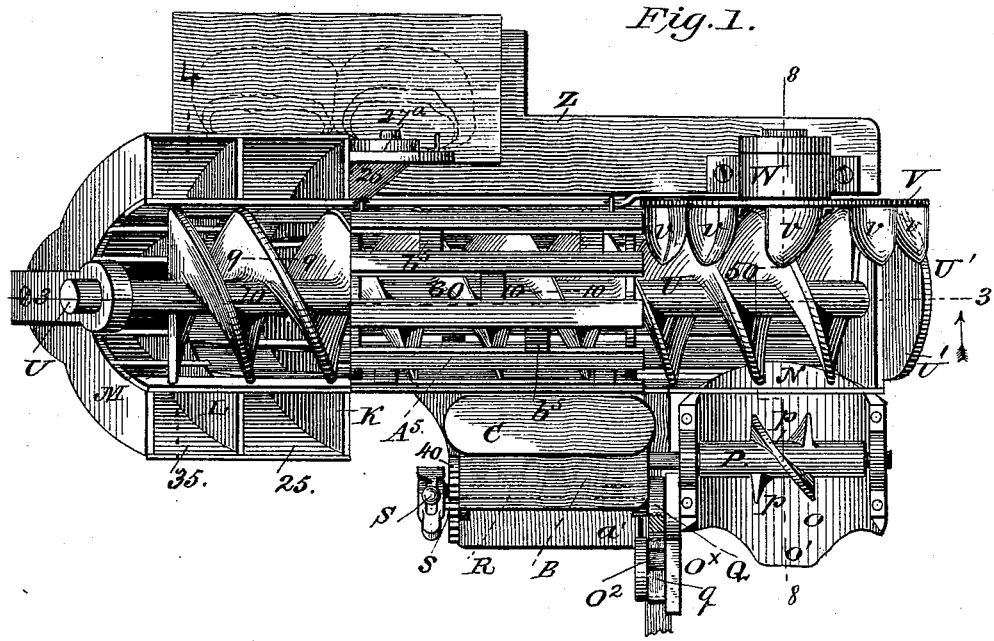
Figure 2:
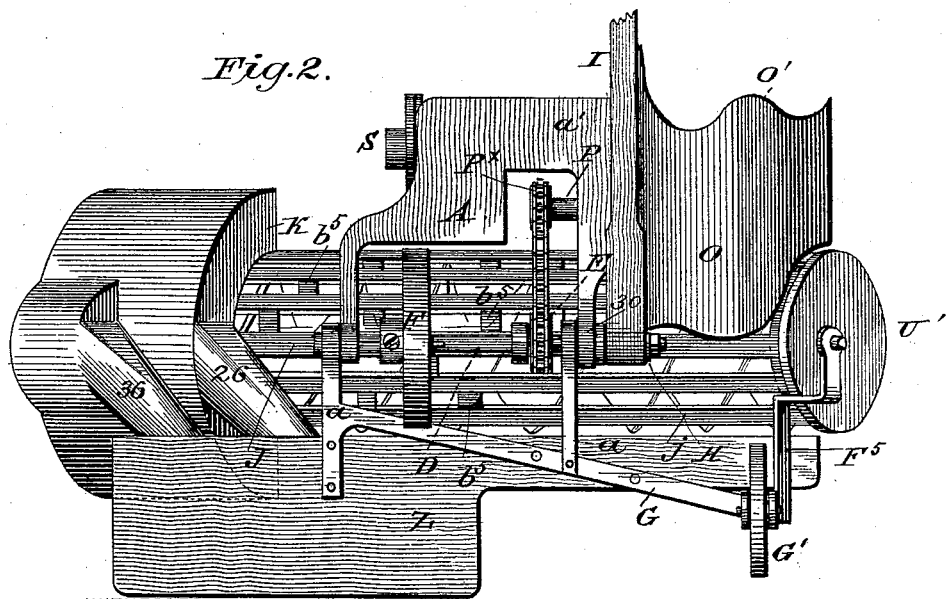

Figure 1 is a top plan view of my improved potato digging machine. Fig. 2 is an inverted plan view of the same. Fig. 3 is a vertical section of the same taken on the line 3—3 Fig. 1, looking in the direction indicated by the arrow. Fig. 4 is a detail cross section taken on the line 4—4 Fig. 3. Fig. 5 is a detail plan view of the upper end of the grate like or separating bottom of the conveyer chamber. Fig. 6 is a detail longitudinal section of the same on the line 6—6 Fig. 5. Fig. 7 is a rear view of the upper end of the conveyer and separating devices. Fig. 8 is a transverse section taken on the line 8—8 Fig. 1; and Figs. 9 and 10 are detail sections of portions of the conveyer blades or wings taken respectively on the lines 9—9 and 10—10 on Fig. 1.

In the practical application of many of the potato digging machines heretofore patented considerable difficulty is experienced, after the tubers are dug up, to properly and uniformly convey them as they are separated from the sprouts and dirt, as they frequently so clog the conveyer and feeder devices, that they become bruised and mashed, as well as making a temporary stopping of the machine frequently necessary. These serious objections I overcome by the arrangement of the conveyer means hereinafter fully described.

Referring now to the accompanying drawings, in which the same letters and numerals indicate like parts in all the figures, A indicates the main frame, which comprises rearwardly extending portions $a$ $a$ and a forwardly extending portion $a'$ which has a vertically disposed platform B on which is mounted the driver's seat C. In the rear portions $a$ $a$ is journaled the main drive and supporting axle D, on which is fixedly held a drive pulley E, for a purpose presently explained, and adjustably but to turn therewith, the main drive and supporting wheel F, such main frame also including a rearwardly extending but diagonally disposed frame G, which extends to a point at the rear of the digger or plow member hereinafter described, at which point is swivelly connected therewith a caster wheel support G', as most clearly shown in Fig. 2, which may be also braced to the outer end of the conveyer axle as indicated at $F^5$.

The axle D, it will be noticed, is extended at one end (the digger end) and has fitted thereon a sleeve H, on which is pivotally held the rear end of the draft pole or tongue I which extends forward, centrally between the plow or digger end and the main wheel, so that the team will walk in between the hills or rows. By providing a draft pole pivotally connected with the main frame, such pole will be held for a free vertical movement incident to the irregular movement of the team, without affecting the main frame, it being, however, obvious that if desired the pole may be rigidly attached to the main frame, without seriously affecting the digging operation.

20 and 30 indicate vertically projecting members or supports, which are pivotally mounted at their lower ends on the drive axle D, while their upper ends are rigidly secured to the conveyer frame, such supports being of different heights, (see Fig. 3) whereby such conveyer will be held elevated at an angle from the digger end upward, in practice about forty degrees. This conveyer frame, the construction of which forms the most essential feature of this invention, comprises practically a receiver portion, a conveying and sprout and dirt separating portion, and an assorting or discharging portion, the whole being, however, combined in substantially one continuous body. The main portion of the conveyer frame consists of a practically semi circular bottom J, formed by a series of longitudinal slats $j$ joined at the lower end to a semi circular end board $j'$ and at the upper end to the semi circular or trough like portions of the division boards K, L and M, in a manner fully hereinafter described. At the lower end, one side of the slatted bottom is cut away to form a receiving opening N, from which projects a trough like chute O, formed at the front end into a digger plow O'; the side walls of such chute having bearings in which is journaled a transverse shaft P provided with oppositely projecting blades $p\,p$, which are in the nature of clod crushing and propelling or feed members, as they serve to break the clods of dirt and throw such dirt and potatoes inward into the conveyer, the shaft P being extended inward over the main frame and provided with a pulley $P^\times$ which is belted with the drive pulley E before referred to.

At the side adjacent the main frame the plow trough or chute O has an extension $O^\times$ which has a projecting stud $O^2$, which seats in the forked end $q$ of a crank arm Q secured on one end of a rock shaft R, journaled transversely under the seat platform and provided at its opposite end with a shifting lever S, having the usual spring actuated detent devices $s$, which engage a segmental rack portion 40 on the platform as shown.

So far as described, it will be readily seen that as the conveyer frame is pivotally supported on the axle D and its lower front end pivotally connected with the crank arm of a rock shaft journaled in advance of, but parallel to such axle, the digger end of such conveyer can be adjusted to dig at a greater or less depth or held up out of operative condition by simply shifting lever S.

At the upper end the conveyer frame has a projecting portion T, from which projects at right angles to the longitudinal axis of such frame a standard $t$, in which and in the board $j'$ is journaled a rotary screw conveyer U, which in the preferred construction is in the nature of a double bladed screw, as shown. It will be noticed by reference to Fig. 3, that the shaft of this conveyer extends through the board $j'$ and has fixedly secured thereon a drive or drag wheel U', which travels on the ground and is rotated as it is drawn thereover, and thereby imparts a rotary motion to the said screw conveyer U, such wheel U' also forming, as it were, a support for the lower end of the conveyer frame. It will also be noticed by reference to such Fig. 3, that while the conveyer U is formed of a single member having continuous screw blades extending from the feed to the discharge end of the frame, it is substantially divided into three parts, indicated by 50, 60 and 70, the lower portion of which, 50, has the peripheral edges of the screw blades blunt (see Fig. 9), and forms the lifter end, as it starts the potatoes on the upward movement, while the central portion 60 has the peripheral edges made sharp (see Fig. 10), and the portion 70 has its blade edges blunt or rounded as shown, the purposes of which will presently appear.

The object in making the lower end of the screw with its blades blunt is to avoid the danger of cutting the potatoes as they are crowded into the feed opening where they enter in somewhat irregular manner, such danger being avoided, however, after they have been started upward in the conveyer in a uniform and regular manner. To provide for such uniform feed, and to avoid the possibility of the potatoes with their plants climbing upward over the screw blades and clogging such conveyer at the feed end, I have arranged at such end a clearer and retarding device which is in the nature of a rotary disk V journaled on a standard W, projected up from a platform Z connected with but projected rearwad from the conveyer frame, and held to rotate in a direction similar to the feed of the screw U. This disk V, it will be noticed by reference to Figs. 1 and 3, has a series of fingers $v$ projected from the perimeter inward over the screw, and which are adapted to successively pass down into the spiral ways of the lifter end of the screw to a point nearly in horizontal line with the axis of such screw (see Fig. 8), such fingers being suitably beveled and of a size to approximately close off such spiral ways at the rear for a purpose best explained as follows:

As the potatoes, sprouts, and dirt are crowded into the lifter or receiving end of the screw, and as such screw revolves, in the direction indicated by the arrow 80, it follows that such plants and tubers with the dirt will have a tendency to crowd up over the hubs or axis portion of the screw and thereby not only clog such end, but also fall back again to the feed opening. By a retarding and clearing disk arranged and operated by screw as shown, the potatoes, with the plants and dirt, will be kept down at the bottom of the conveyer and moved uniformly upward. At a point between the lifter end and the assorting end, a slatted semi circular cover portion $A^5$ is hinged to the bottom portion and secured thereto, which cover, as well as the bottom portion J, has at intervals transversely disposed rib like members $b^5$, which in conjunction with the sharp edges of the screw, form shear or cutter members, which sever the sprouts or plant portions from the tubers as they are carried up over the central part of the bottom of conveyer frame, it being understood that as the potatoes, with their sprouts and the dirt, are carried up, the dirt is screened through the slatted bottom, and as the sprouts spread out between the slats, they engage the ribs and are severed by the continuously rotating screw blades; the severed sprouts falling with the dirt to the outside of the machine. After the tubers have been thus separated from the sprouts and dirt, they pass up into the upper or assorting end of the conveyer, which end is open at the top, and in which the upper non cutting section of the screw rotates.

It will be noticed by reference to Fig. 5 that the slatted bottom proper, ends at the point where the assorting end begins, the slats being extended but reduced to form thin finger members 2, which extend over the first receiving trough 25 and are spaced apart sufficient to form passages 27 for the smaller sized potatoes, which fall down into the trough 25 from which they escape through a discharge spout 26 having a valved mouth $27^a$, to which may be connected a bag or other receptacle as shown. It will be also noticed that the passages 27 extend about half way over the trough 25, at which point they are closed by the upwardly inclined guide portions 28, which form a continuous semi circular way to lead the larger potatoes up to pass into the upper trough 35, and to prevent the potatoes becoming wedged in between the fingers 2, they are tapered from the inner edge of the guides 28 to the edge of the trough 35 as clearly shown in Figs. 5 and 6. The trough 35 has a spout 36, which has a valved mouth or throat 37 to which is connected a bag or other receptacle, such bags being supported on a suitable shelf above the platform Z, which also forms the support for the man or boy who has charge of the bagging devices during the operation of the machine.

From the foregoing description, taken in connection with the accompanying drawings, it is thought the complete operation of the machine will be readily understood, and the advantages be apparent.

Having thus described my invention, what I claim, and desire to secure by Letters Patent, is—

1. The combination, with the main frame, the supporting axle and main drive wheel and the caster wheel supports, of a conveyer and digging mechanism, pivotally supported on the main frame, having at its digger end a forwardly projecting member, a rock shaft journaled parallel with but in advance of the axle, said shaft having a crank member, having a pivotal connection with the aforesaid projecting member, and an operating lever, all arranged substantially as shown and described.

2. In a potato digging machine, the combination with the frame and supporting means, of a conveyer frame disposed transversely at an angle, pivotally connected to such main frame, having at its lower end a forwardly projecting digger or plow portion, and a screw conveyer journaled in such frame, having a drive pulley held to run on the ground, all arranged substantially as shown and for the purposes described.

3. In a potato digging machine having a digging plow portion and a screw conveyer projected upward at right angles thereto, of a combined retarding and screw clearing mechanism having portions fitting between the spiral ways of the receiving end of the said screw conveyer, as and for the purposes described.

4. In a potato digging machine, the combination with the main frame, the digger plow portion, the conveyer or receiving chamber and the screw conveyer, having a drive or ground engaging wheel at its lower end, of a rotary clearing disk journaled on the conveyer or frame, having outwardly projecting studs or fingers projected to enter the rear spiral way portions of the feed end of the screw and adapted to be rotated in the direction of the feed of such screw by the rotation of the said screw, all arranged substantially as shown and described.

5. The combination with the main frame, the diagonally and transversely disposed conveyer frame having bearing portions at each end, a forwardly projecting digger trough and feed opening at the lower end, and a conveyer screw journaled in such conveyer bearings, having a projecting stud or axle portion at the lower end, and a drive or ground wheel secured thereon, of the rotary clearer disk, journaled at the rear of the feed opening of the conveyer frame having outwardly projecting finger portions, the lower ones of which are held to engage the rear spiral portions of the feed end of the screw and be thereby moved successively in engagement therewith, all substantially as shown and for the purposes described.

6. In a potato digging machine, substantially as described, the combination with the main frame, having a main and caster wheel support, and draft pole projected forward at a point about centrally of such wheel supports, of a diagonally and transversely disposed conveyer frame having a slatted bottom, with its lower end extended to a point at one side of the draft pole, and formed with a digger plow, its upper end having separating portions, and receiving chambers connected therewith, and a screw conveyer journaled longitudinally in such frame, and having at its lower end a drive or ground wheel, whereby it is rotated, all substantially as shown and described.

7. In a potato digging machine a conveyer or receiver, arranged to elevate the potatoes as they are dug, having a slatted bottom, and a receiving opening at the plow end, of a screw conveyer journaled therein, having its blade portion at the receiving end formed blunt, and sharp at the slatted or elevating portion, as and for the purposes described.

8. The combination in a potato digging machine, with the digging plow and a diagonally disposed conveyer frame held transversely to the plow, said frame having a central portion, formed longitudinally slatted, connected at intervals by transverse members, of a screw conveyer journaled in such frame, having such of its blade portions as operate in such central portion formed with sharp peripheral edges, as and for the purposes described.

9. In a potato digging machine substantially as described, the combination with the digger plow, the conveyer frame projected upward therefrom at right angles, said frame having a feed opening at one side of the lower end, a substantially circular and longitudinally slatted central portion, and separating portions at the upper end, of a screw conveyer, having the end portions of its spiral blades made with blunt peripheral edges and its central portion made with such edges sharpened, all substantially as shown and described.

10. The combination of the conveyer frame, the screw conveyer operating therein, said frame having a longitudinally slatted bottom, the upper end of which terminates in reduced finger portions, whereby passages are formed, said passages terminating in upwardly inclined guide members, arranged between the fingers, such fingers tapering to a point from the inner edge of the guides upward, and independent trough or receiving chambers held, one to receive the smaller potatoes which pass through the passages, and the other the larger ones which are carried up over the guides.

11. In a potato digger substantially as described, the combination with a screw conveyer, retarding and clearing members projected in the rear spiral way portions, and held to be engaged thereby and moved successively downward into such ways, substantially as shown and for the purposes described.

In testimony whereof I affix my signature in presence of two witnesses.

CHARLES H. HALL.

Witnesses:
DANIEL F. TYLER,
FRANK E. FUSEE.